(12) United States Patent
Netuschill et al.

(10) Patent No.: US 11,654,515 B2
(45) Date of Patent: May 23, 2023

(54) METHOD FOR PRODUCING A MULTI-DECORATION AND/OR MULTICOLOURED HOROLOGICAL COMPONENT HAVING A CERAMIC STRUCTURE

(71) Applicant: Comadur SA, Le Locle (CH)

(72) Inventors: Alexandre Netuschill, Le Cemeux-Pequignot (CH); Fabien Bontaz, Sonvilier (CH)

(73) Assignee: Comadur S.A., Le Locle (CH)

( * ) Notice: Subject to any disclaimer, the term of this patent is extended or adjusted under 35 U.S.C. 154(b) by 554 days.

(21) Appl. No.: 16/783,815

(22) Filed: Feb. 6, 2020

(65) Prior Publication Data
US 2020/0269356 A1 Aug. 27, 2020

(30) Foreign Application Priority Data
Feb. 25, 2019 (EP) .................... 19159125

(51) Int. Cl.
*B29C 39/10* (2006.01)
*B23K 26/38* (2014.01)
(Continued)

(52) U.S. Cl.
CPC .............. *B23K 26/38* (2013.01); *A44C 27/00* (2013.01); *B29C 39/10* (2013.01); *B44C 1/225* (2013.01);
(Continued)

(58) Field of Classification Search
CPC ......... B23K 26/38; A44C 27/00; B29C 39/10; B44C 1/225; B44C 1/228; B44C 1/26;
(Continued)

(56) References Cited

U.S. PATENT DOCUMENTS 8,585,956 B1 * 11/2013 Pagryzinski ............. B41M 5/24
264/400
9,150,978 B2 * 10/2015 Netuschill .............. G04B 19/18
(Continued)

FOREIGN PATENT DOCUMENTS

CH 708151 A2 12/2014
CH 710 494 A2 6/2016
(Continued)

OTHER PUBLICATIONS

Communication dated Apr. 22, 2021, issued by the Korean Intellectual Property Office in Korean Application No. 10-2020-0019183.
(Continued)

*Primary Examiner* — Ryan J. Walters
(74) *Attorney, Agent, or Firm* — Sughrue Mion, PLLC

(57) ABSTRACT

Method for producing an external horological element (100) which is a heterogeneous component, according to which a primary cavity (10) is produced in a structure (1), only the periphery of this said primary cavity (10) is re-machined or laser machined, which primary cavity (10) is filled with a second material that is different in appearance from the first material in order to produce a primary insert (2), where the bottom of this said primary cavity (10) is left rough before being filled with said second material, and, in the thickness of this primary insert (2), a secondary cavity (20) is produced, which is filled with a third material that is different in appearance from the first material and/or from the second material in order to produce a secondary insert (3).

16 Claims, 5 Drawing Sheets

(51) Int. Cl.
  *A44C 27/00* (2006.01)
  *G04D 99/00* (2006.01)
  *B44C 1/22* (2006.01)
  *B44C 1/26* (2006.01)
  *B44C 3/12* (2006.01)
  *G04B 45/00* (2006.01)
  *G04B 37/22* (2006.01)
  *B29K 33/04* (2006.01)
  *B29K 63/00* (2006.01)
  *B29L 31/00* (2006.01)

(52) U.S. Cl.
  CPC ............ *B44C 1/228* (2013.01); *B44C 1/26* (2013.01); *B44C 3/12* (2013.01); *G04B 37/22* (2013.01); *G04B 45/0076* (2013.01); *G04D 99/00* (2013.01); *B29K 2033/04* (2013.01); *B29K 2063/00* (2013.01); *B29L 2031/739* (2013.01)

(58) Field of Classification Search
  CPC .. B44C 3/12; B44C 1/22; G04B 37/22; G04B 45/0076; G04B 19/103; G04B 19/12; G04B 19/18; G04B 45/0015; G04B 19/10; G04D 99/00; B29K 2033/04; B29K 2063/00; B29L 2031/739; B28D 1/003
  See application file for complete search history.

(56) References Cited

U.S. PATENT DOCUMENTS

| | | | | |
|---|---|---|---|---|
| 9,423,772 | B2* | 8/2016 | Fernandez Ciurleo | ............... G04B 37/225 |
| 10,585,399 | B2* | 3/2020 | Issartel | ............... B23K 26/355 |
| 2006/0062971 | A1 | 3/2006 | Bourban et al. | |
| 2011/0259753 | A1* | 10/2011 | Grossenbacher | ...... C25D 5/627 205/162 |
| 2015/0092524 | A1* | 4/2015 | Verdon | ............ B44C 3/10 368/285 |
| 2016/0176228 | A1 | 6/2016 | Dubach et al. | |
| 2017/0038734 | A1* | 2/2017 | Issartel | ............ B23K 26/0624 |
| 2017/0255166 | A1* | 9/2017 | Suzuki | ............... B29C 33/42 |
| 2018/0032034 | A1 | 2/2018 | Vuille et al. | |

FOREIGN PATENT DOCUMENTS

| | | |
|---|---|---|
| CH | 713 871 A1 | 1/2019 |
| CN | 102795036 A | 11/2012 |
| CN | 102193491 B | 11/2013 |
| CN | 102066131 B | 12/2013 |
| CN | 104516256 A | 4/2015 |
| CN | 107236924 A | 10/2017 |
| CN | 108778774 A | 11/2018 |
| DE | 102011052669 A1 | 4/2012 |
| EP | 2 856 903 A1 | 4/2015 |
| EP | 3 126 914 | 2/2017 |
| JP | H07140262 A | 6/1995 |
| JP | 2003326896 A | 11/2003 |
| JP | 2005015898 A | 1/2005 |
| JP | 2007-86027 A | 4/2007 |
| JP | 2014085355 A | 5/2014 |
| JP | 2016-118537 A | 6/2016 |
| JP | 2017-517006 A | 6/2017 |
| WO | 2015/150552 A1 | 10/2015 |

OTHER PUBLICATIONS

European Search Report issued in EP 19 15 9125 dated Aug. 9, 2019.
Communication dated Feb. 5, 2021, from the Intellectual Property of India in application No. 202044007272.
Communication dated Jan. 21, 2021 from the Taiwanese Intellectual Property Office in application No. 109103675.
Office Action dated Oct. 8, 2020 from Russian Patent Office in RU Application No. 2020107873.
Communication dated Feb. 16, 2021, from the Japanese Patent Office in Application No. 2020-022227.
Communication dated Mar. 29, 2021, from the China National Intellectual Property Administration in application No. 202010116655.0.

* cited by examiner

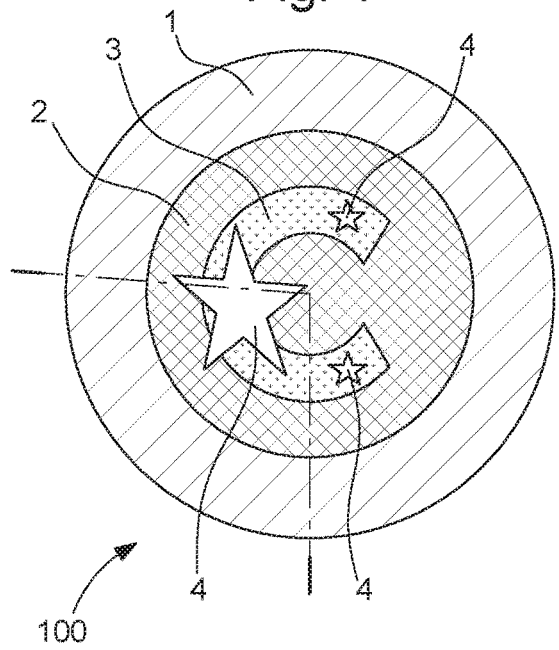
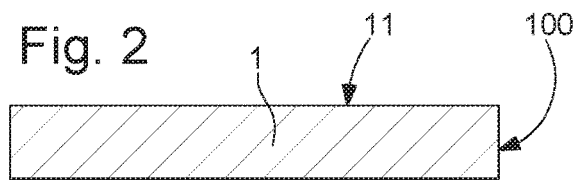
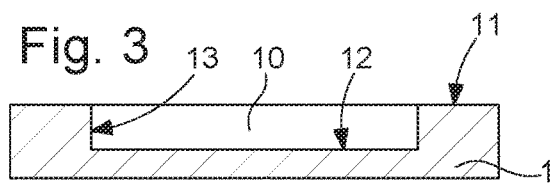
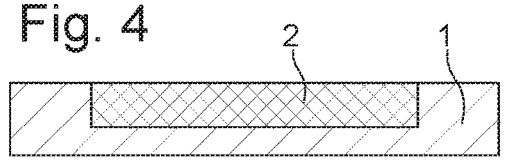
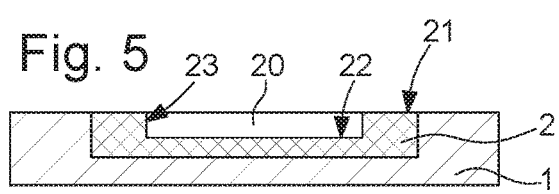
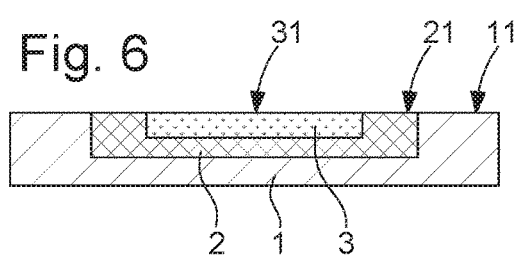
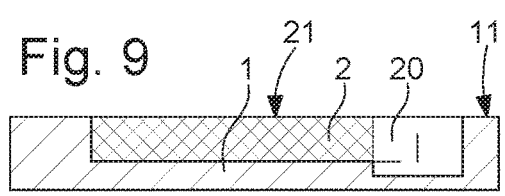
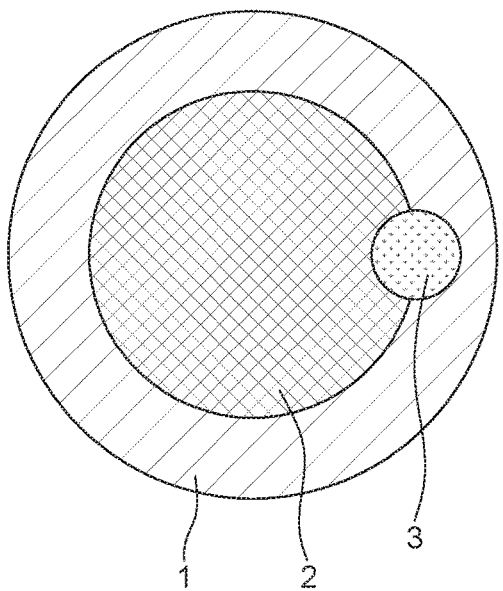

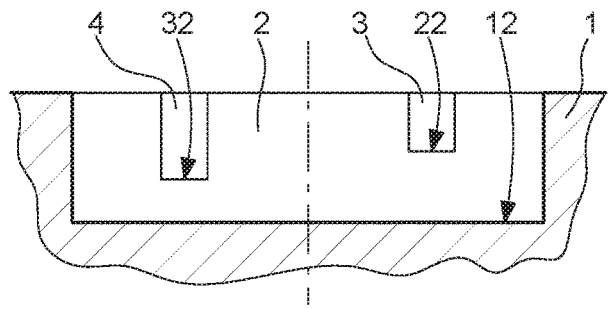
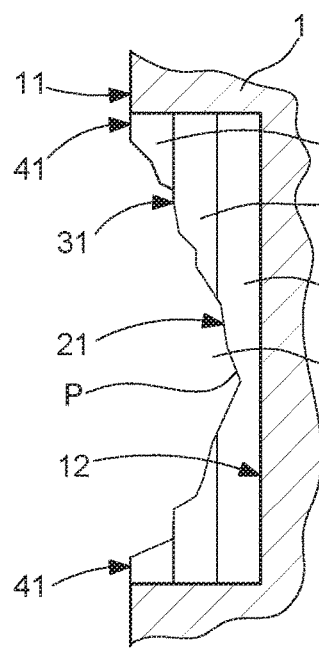 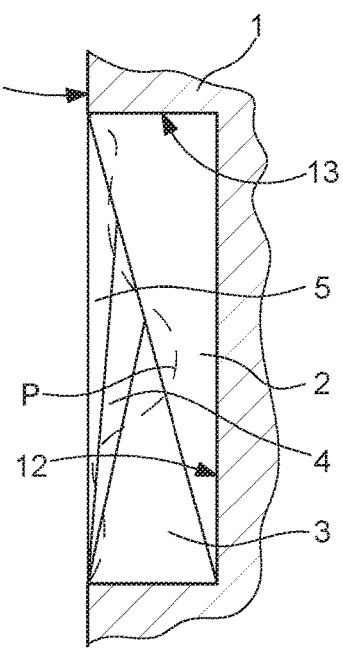 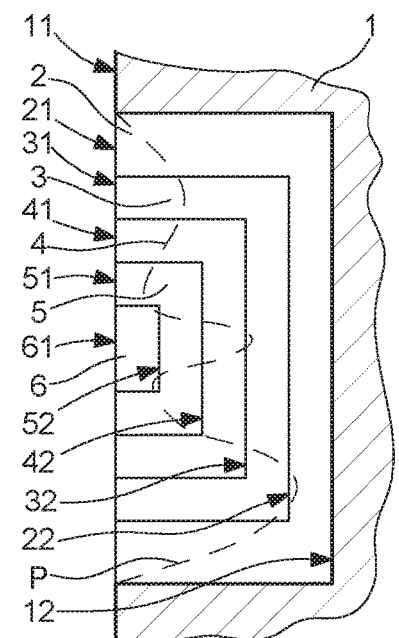
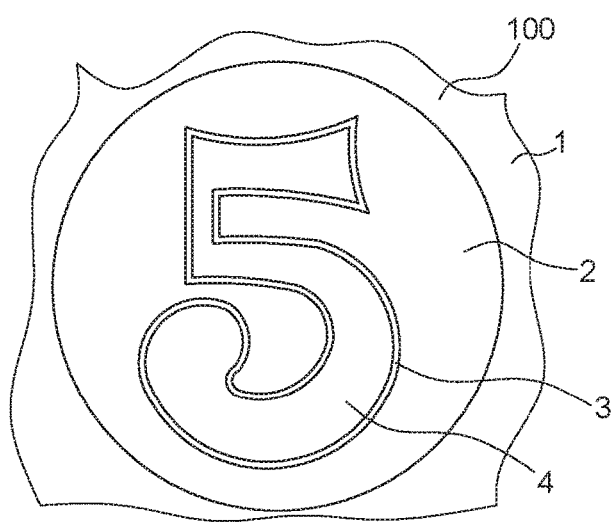

Fig. 11
Fig. 12
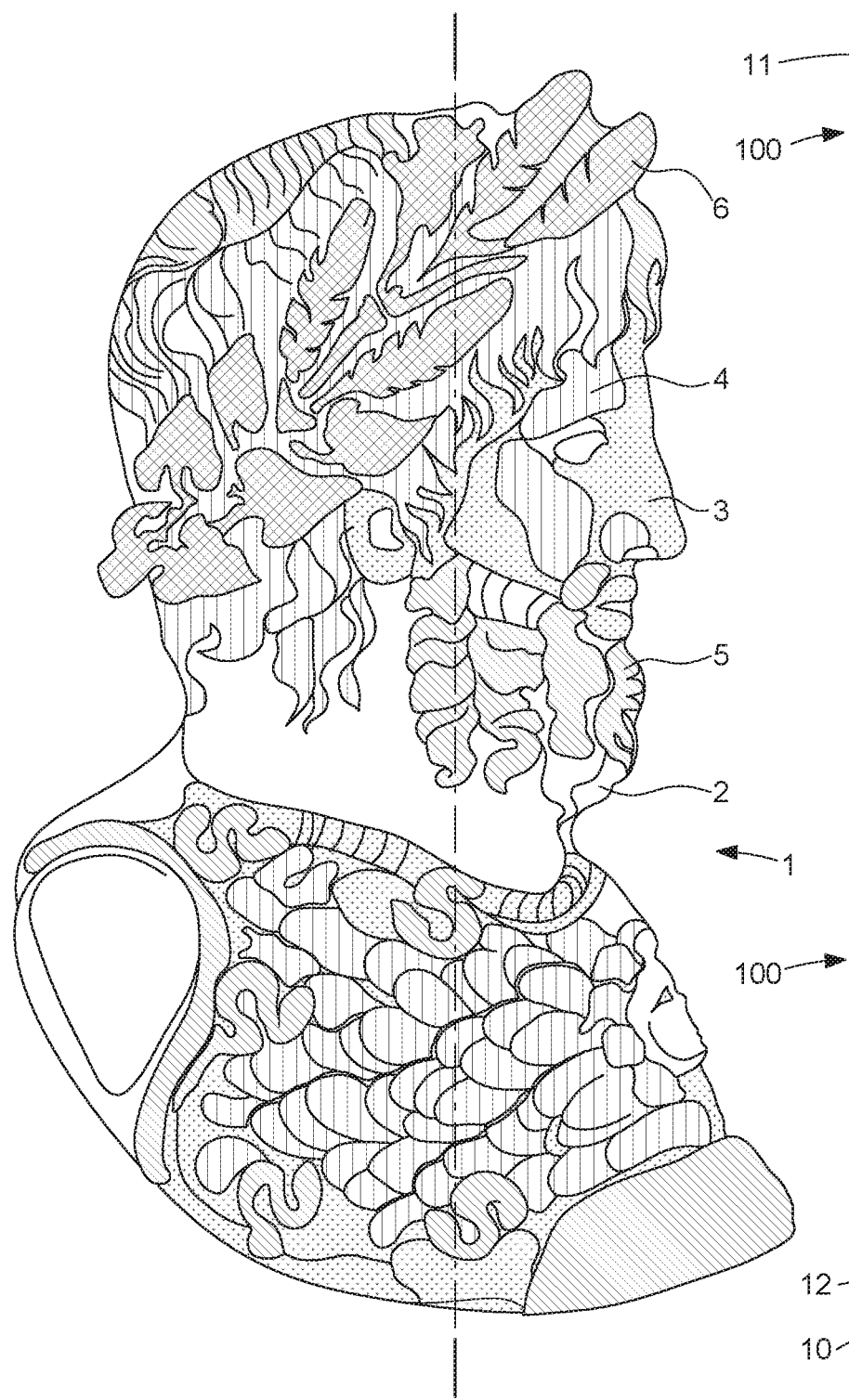
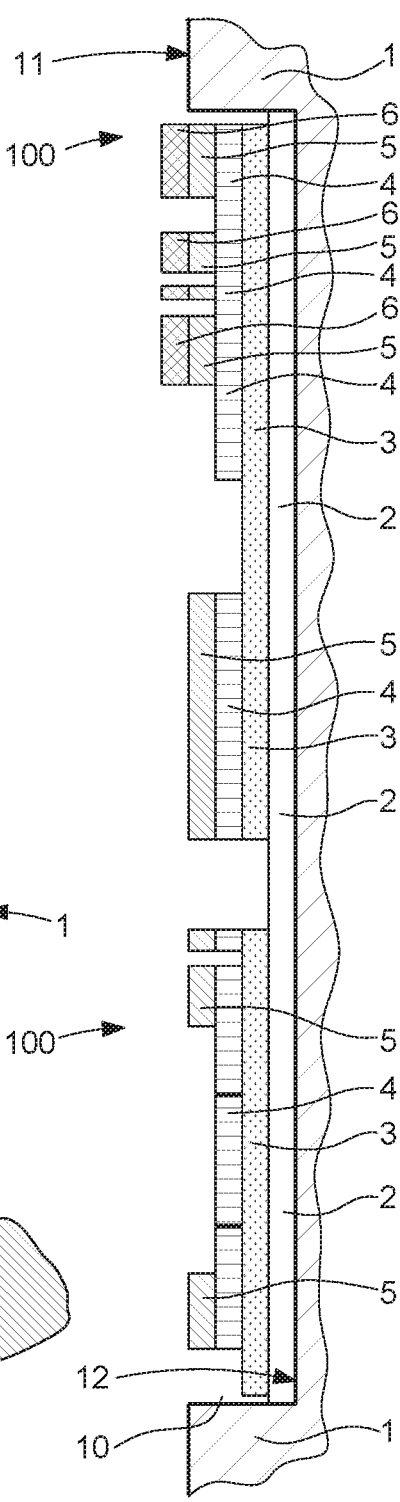

Fig. 17
Fig. 18
Fig. 19
Fig. 20
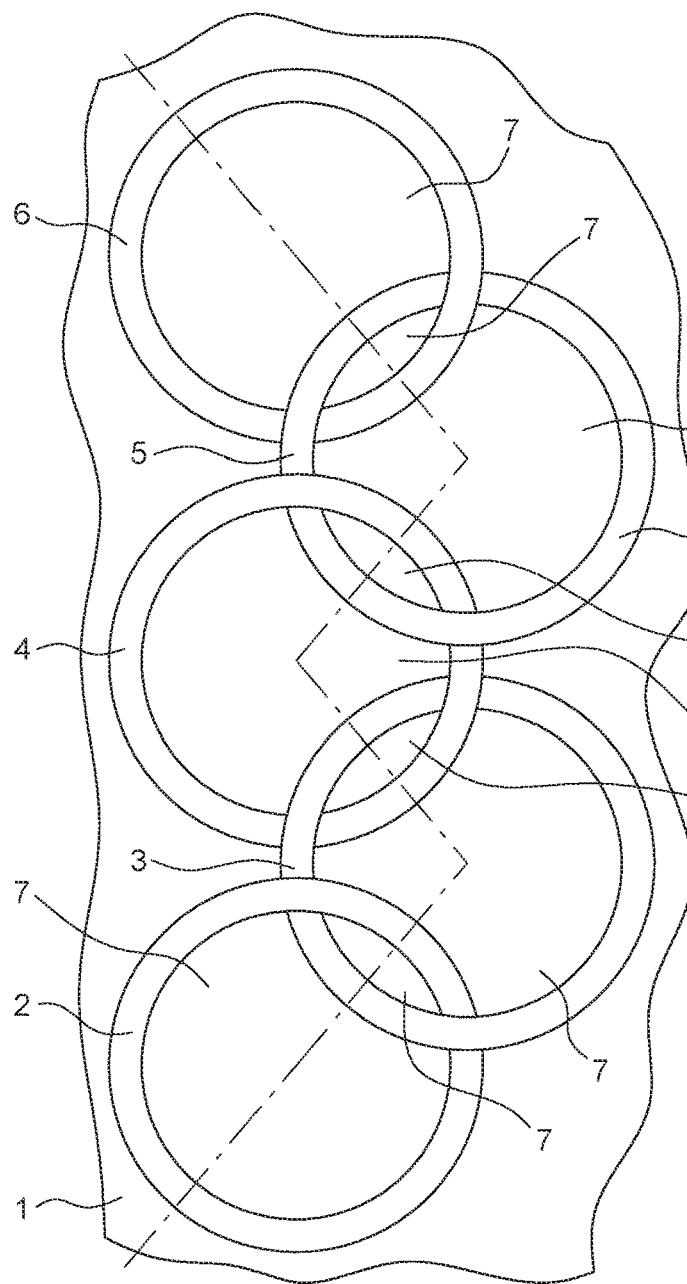
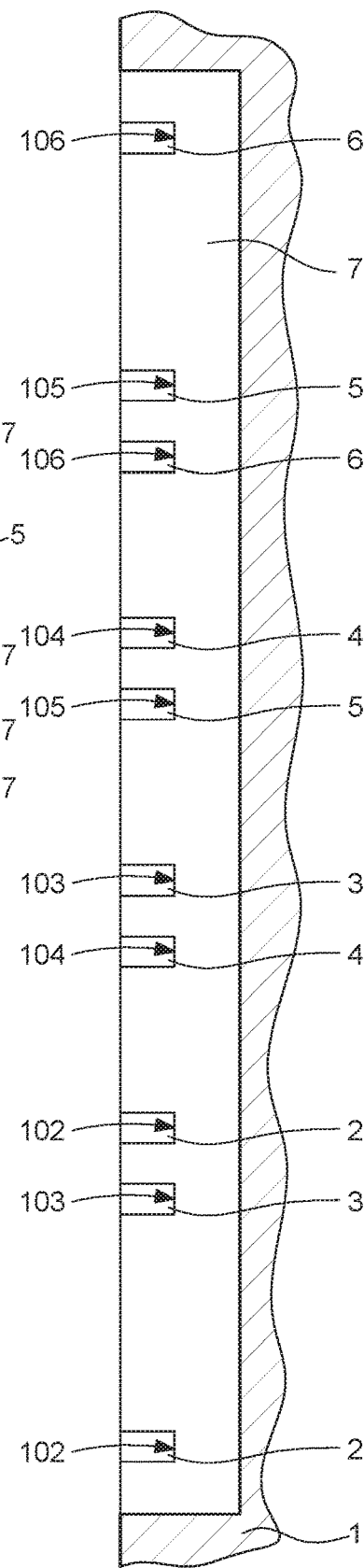
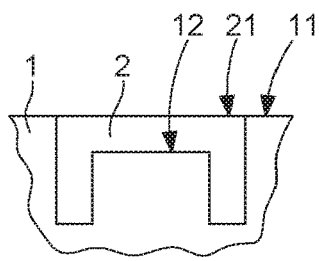
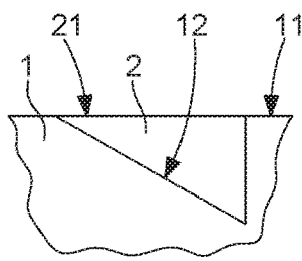

METHOD FOR PRODUCING A MULTI-DECORATION AND/OR MULTICOLOURED HOROLOGICAL COMPONENT HAVING A CERAMIC STRUCTURE

CROSS-REFERENCE TO RELATED APPLICATIONS

This application claims priority to European Patent Application No. 19159125.4, filed Feb. 25, 2019, the entire contents of which are incorporated herein by reference.

FIELD OF THE INVENTION

The invention relates to a method for manufacturing a horological component having a structure made of a first material which is a hard material or a ceramic, which structure comprises, in the thickness thereof, at least one primary insert formed by a second material that is different in appearance from said first material.

The invention relates to the field of horological components made of hard materials, in particular of ceramic, and to the production thereof.

BACKGROUND OF THE INVENTION

The decoration of objects made of hard materials, or even of very hard materials, such as ceramic, is hard to achieve, and is generally limited to the surface deposition of a decoration by pad printing, silkscreen, or digital printing. For horological components, the small dimensions involved complicate such operations.

Moreover, the surface deposition of polymers does not procure the wear resistance guarantees required in the horological industry. In order to overcome this defect, a cavity can be produced deep within the component, and this cavity can then be filled with a relevant material, for example with a coloured polymer or a lacquer, so as to obtain a decoration that is substantially at the same level or below the material of the decoration. However, such a production only procures clean filling, with an acceptable resolution, using a single type of lacquer, and thus for a single type of decoration, in particular a single colour.

The patent document EP2856903A1 filed by RADO describes a method for manufacturing an inlaid ceramic element for a timepiece comprising the following steps: a) forming a ceramic body; b) etching at least one recess in one face of the ceramic body, each at least one recess forming the pattern cavity for a decoration; c) changing the surface state of the bottom of said at least one recess in order to increase the contact surface thereof; d) depositing, by thermal spraying, a second ceramic material above said at least one recess in order to totally fill said at least one recess; e) flattening said second ceramic material so that said second ceramic material remains only in the hollow of said at least one recess.

The patent document CH713871A1 filed by RICHEMONT describes a component for a timepiece having a plurality of graphic elements, the component comprising a substrate, at least one portion whereof is coated with a coating comprising a plurality of layers, including an external layer and at least one intermediate layer formed between the substrate and the external layer, the intermediate layer having a different appearance from that of the external layer; the coating comprising at least one first opening defining a first graphic element, the first opening having a first depth allowing the intermediate layer to appear; and a second opening defining a second graphic element, the second opening having a second depth that is different from the first depth; such that the component comprises at least two graphic elements that differ in appearance.

SUMMARY OF THE INVENTION

The invention proposes the production of a decoration, in particular made of a polymer material, epoxy lacquer, acrylic or similar material in cavities hollowed out from hard materials such as ceramics with a plurality of coloured areas and/or areas of different appearances. The invention aims to overcome the problem of multiple decorations by providing, in a first area filled with a lacquer or similar material, a second or additional areas that could be filled in turn with similar materials that nonetheless are different in appearance, at least in sets of two.

The invention must in particular allow a decoration made of a polymer (epoxy lacquer, acrylic, SLN or similar material) or metal-polymer combination to be produced in cavities hollowed out from hard materials with a plurality of coloured areas.

For this purpose, the invention relates to a method for manufacturing a horological component according to claim 1.

BRIEF DESCRIPTION OF THE DRAWINGS

Other features and advantages of the invention will be better understood upon reading the following detailed description given with reference to the accompanying drawings, in which:

FIG. 1 diagrammatically shows a plan view of a horological component produced according to the invention, comprising a structure made of a hard metal or ceramic, into which inserts are inserted, which inserts bear decorations and/or colours that are different from this structure; a primary insert is embedded in the structure, a secondary insert is embedded in the primary insert; two tertiary inserts in the shape of small stars are embedded in the secondary insert, another tertiary insert in the shape of a larger star is inserted and intercaled both in the primary insert and the secondary insert;

FIGS. 2 to 6 show a cross sectional view of the successive steps of manufacturing a primary insert in the shape of a disc formed in a first recess machined in this structure, then a secondary insert in the shape of an arc formed in a second recess made in this primary insert;

FIG. 7 shows a sectional view of FIG. 1 passing through different inserts, along the sectional line shown in FIG. 1;

FIG. 8 shows, in a similar manner to FIG. 1, another example of a component produced according to the invention, with a secondary insert housed and intercaled between the structure and the primary insert, in the same way as the tertiary insert in the shape of a larger star in FIG. 1 is inserted and intercaled both in the primary insert and the secondary insert, and FIGS. 9 and 10 show, in a similar manner to FIGS. 2 to 6, the machining of a recess made both in the structure and the primary insert, in order to form this secondary insert therein;

FIGS. 11 and 12 show, respectively via a plan view and sectional view, the production of a decoration of the cameo type engraved in low relief in a structure that has been hollowed out and filled with inserts, either made inside one another in successive cavities that can no longer been seen in FIG. 12 on which the decoration as a whole has undergone contour trimming, or at least partially superimposed on top of one another in a cavity of the structure or of the primary insert in the present case; the engraving carried out at different depths reveals the decoration specific to each layer, in the same way as a natural shell cameo; in this example, an entire layer is removed in order to view the next layer throughout the entire thickness thereof;

FIG. 13 shows, in a similar manner to FIG. 12, an alternative embodiment with substantially parallel inserts superimposed in a same cavity, and engraved in a three-dimensional manner according to a skewed profile, combining both the revelation of the decoration specific to each layer, and a volume sculpted in the round;

FIG. 14 shows, in a similar manner to FIG. 13 an alternative embodiment with inserts of non-constant thicknesses, in which a three-dimensional profile shown in the form of a broken line will be engraved;

FIG. 15 shows, in a similar manner to FIG. 13 an alternative embodiment with inserts interlaced with one another, in which a three-dimensional profile shown in the form of a broken line will be engraved;

FIG. 16 shows a front view of a display component produced according to the invention, with a very thin edge of a number that is difficult to produce using other methods;

FIG. 17 shows, in a similar manner to FIG. 1, a component decorated with Olympic symbols, each of the official colour, partially interlaced with one another and all embedded in the structure, and FIG. 18 is a cross-section of this production;

FIG. 19 shows, in a similar manner to FIG. 13, one example of a primary insert that is deeper at the periphery thereof than at the central area thereof, so as to guarantee very high mechanical strength;

FIG. 20 shows, in a similar manner to FIG. 13, one example of a primary insert of variable thickness;

DETAILED DESCRIPTION OF THE PREFERRED EMBODIMENTS

Figure 21:
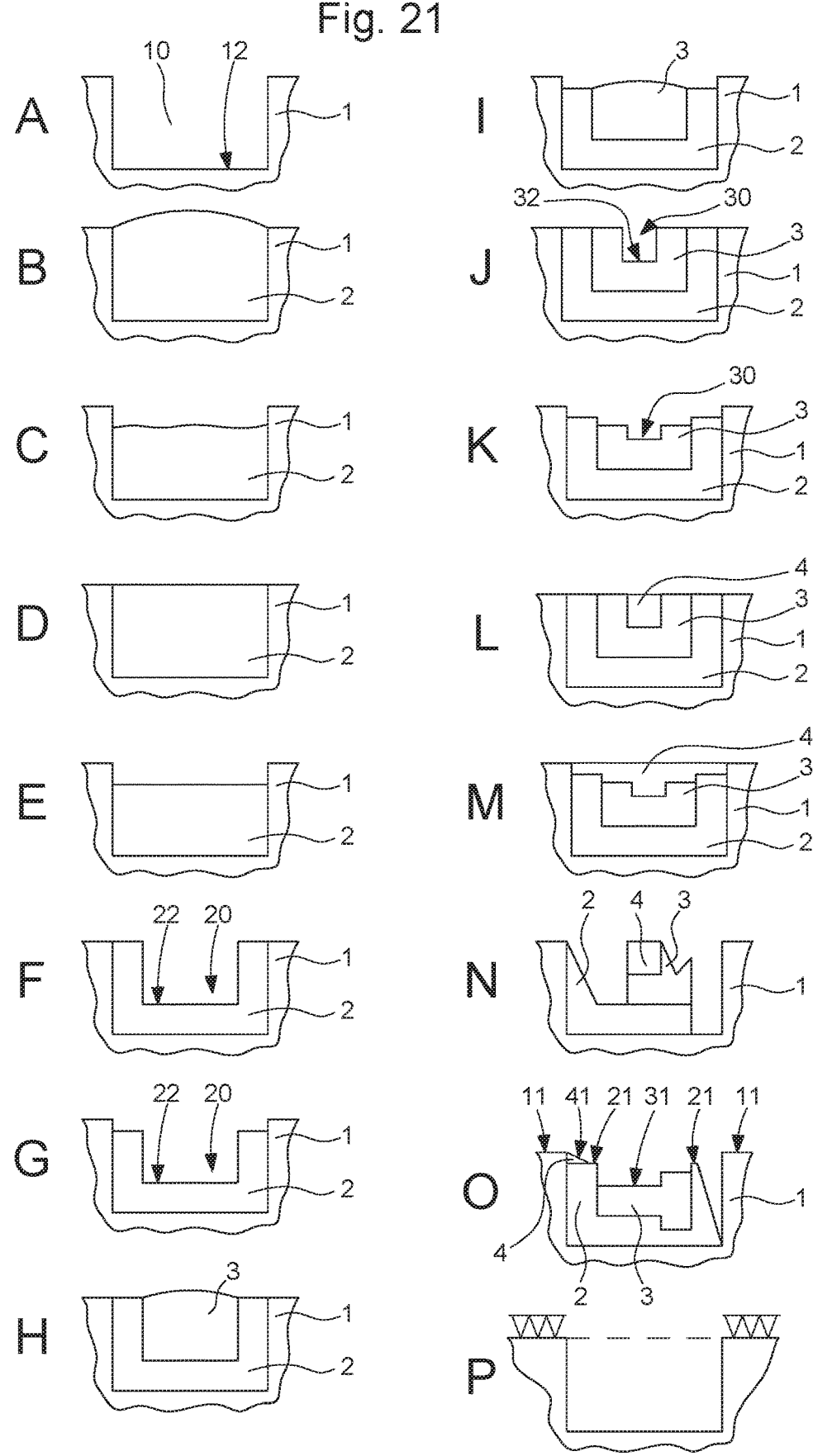
FIG. 21 shows, in a similar manner to FIG. 13, different alternative embodiments showing the different relative levels between the top surfaces of the different inserts: set back, flush, projecting; the images L, M and P show the finished components with a continuous visible surface, or a surface that has been rectified or polished in the case of the image P, the images C, E, G, I, J, K, N, and O show insert surfaces that are set back from the surface of the structure, and the images B and H show an insert that projects from the surface of the structure.

The invention relates to the production of a horological component 100. This element 100 comprises a structure 1 made of a first material which is a hard material or a ceramic. This structure 1 comprises, in the thickness thereof, at least one primary insert 2 formed by a second material that is different in appearance from the first material. This second material can be of the same kind as the first material, or of a different kind from the first material.

Preferably, at least one such primary insert 2 comprises, in the thickness thereof, at least one secondary insert 3 formed by a third material that is different in appearance from the first material and/or from the second material. In the same manner, this third material can be of the same kind as the first or second material, or of a different kind from the first or second material.

More particularly, the structure 1 comprises at least one tertiary insert 4, which is inserted into the first material and/or into the second material and/or into the third material, and which is formed by a fourth material that is different in appearance from the first material and/or from the second material and/or from the third material.

More particularly, the structure 1 comprises a plurality of basic inserts inserted at least partially into one another and filled with materials having different appearances, in sets of two.

In one particular embodiment, at least one basic insert is inserted and intercaled, or both into the structure 1 and into at least one other basic insert, or both into at least two other basic inserts.

It is understood that the invention allows all types of decoration to be produced, and in particular but not limited to a nested structure with inserts included inside one another such as those shown in FIGS. 6 and 15, or a structure comprising decorative areas that overlap, such as the Olympic symbols decoration for example, shown in FIGS. 17 and 18, and which comprises five ring-shaped inserts 2, 3, 4, 5, 6, each having a colour, inserted into a primary insert 7 forming the background, which is itself inserted into the structure 1, or similar.

FIG. 19 shows an example of a primary insert 2 that is deeper at the periphery thereof than at the central area thereof, so as to guarantee very high mechanical strength.

In a specific case, the visible surfaces of the inserts comprised in the component 100 constitute a low relief, such as that shown, for example, in FIGS. 11 and 12, which show a cameo-type engraving with successive layers of different appearances, revealed by the engraving, such as when engraving a shell; the edge of the successive inserts integrated into one another is not shown here, a peripheral trench delimiting the entirety of the cameo relative to the back structure 1. These successive layers can consist of inserts interlocked with one another, and/or of inserts simply superimposed on top of one another. Such a decoration is particularly suitable for a dial, or for a case back, or similar element. FIG. 12 shows a simple engraving of the cameo, with parallel levels, but engravings along skewed surfaces can of course be carried out, according to a skewed profile P, as shown in FIG. 13, 14 or 15. The filling of the successive cavities is not necessarily parallel to the front surfaces or to the bottom of the cavities; FIGS. 14 and 20 show examples in which filling is carried out at variable thicknesses.

In one particular alternative embodiment, the visible surface of at least one insert comprised in the component 100 is set back relative to the local level of the visible surface 11 of the structure 1; even more particularly, the visible surfaces of the inserts comprised in the component 100 are each set back relative to the local level of the visible surface 11 of the structure 1.

In another particular alternative embodiment, the visible surface of at least one insert comprised in the component 100 is flush with the local level of the visible surface 11 of the structure 1; even more particularly, the visible surfaces of the inserts comprised in the component 100 are flush with the level of the visible surface 11 of the structure 1.

In yet another particular alternative embodiment, the visible surface of at least one insert comprised in the component 100 projects relative to the local level of the visible surface 11 of the structure 1; even more particularly, the visible surfaces of the inserts comprised in the component 100 each project relative to the local level of the visible surface 11 of the structure 1.

Such a component 100 comprising at least one superficial insert comprising a relief projecting from the visible surface 11 of the structure 1 advantageously constitutes a display element and/or a touch element for tactile identification by the user, and/or for easy grasping by the user, for example in the case of a bezel, a crown, a push-piece, a bolt, a clasp, etc.

In one particular embodiment, the second material is a hard material or a ceramic. In such a case, the creation of an opening in this second material is advantageously made by a laser means.

In one particular embodiment, the material of at least one insert, comprised in the component 100, is a polymer or an epoxy resin or an acrylate resin or an alumina-filled resin or a zirconia-filled resin. Even more particularly, the material of each insert, comprised in the component 100, is a polymer or an epoxy resin or an acrylate resin or an alumina-filled resin or a zirconia-filled resin.

In one particular embodiment, the material of at least one insert, comprised in the component 100, is an enamel. Even more particularly, the material of each insert, comprised in the component 100, is an enamel.

In one particular embodiment, the component 100 comprises at least one insert made of a transparent or translucent material.

In one particular embodiment, the component 100 comprises at least one superficial insert covering at least one other insert, and more particularly all of the other inserts, of this component 100, which superficial insert is made of a transparent or translucent material.

In one particular embodiment, the visible surface of the component 100 is formed by the visible surface 11 of the structure 1, and by the visible surface of each superficial insert made of a transparent or translucent material which is flush with the level of the visible surface 11 of the structure 1.

In one particular embodiment, the component 100 comprises at least one light-reflecting insert.

In one particular embodiment, the component 100 comprises at least one fluorescent or phosphorescent insert.

It goes without saying that different types of inserts from those listed hereinabove can be combined within the same component 100.

It is understood that, although the component 100 is advantageously an external component, it can also constitute a structural component of a horological movement, or of an additional mechanism, such as a plate, a bridge, an oscillating weight, a balance, an inertial weight, a carriage of a tourbillon or of a karussel, or any other functional and not merely decorative component.

In one particular embodiment, the component 100 is a watch bezel or a watch case or a watch back or a watch crown or a watch push-piece or a watch crystal or a watch bracelet element or a watch bracelet clasp or a watch horn.

For example, the component 100 can be a watch bezel made of a dark ceramic, for example black, with a red lacquer in one quadrant, and the different indexes and displays in a white lacquer.

The invention relates to a method for manufacturing a heterogeneous horological component 100, according to which a structure 1 made of a first material, which is a hard material or a ceramic, is obtained, or such a structure 1 is produced. Either this structure 1 already comprises at least one primary cavity 10, or at least one primary cavity 10 is made in this structure 1, in particular by laser machining or a similar method, however is not limited thereto.

At least one such primary cavity 10 is then fully or partially filled with a second material that is different in appearance from the first material, in order to produce a primary insert 2.

According to the invention, at least one secondary cavity 20 is produced, at least in the thickness of the second material of the primary insert 2, which secondary cavity 20 is fully or partially filled with a third material that is different in appearance from the first material and/or from the second material, in order to produce a secondary insert 3.

More particularly, in the thickness of the first material and/or of the second material and/or of the third material, at least one tertiary cavity 30 is produced, which is fully or partially filled with a fourth material that is different in appearance from the first material and/or from the second material and/or from the third material, in order to produce a tertiary insert 4.

More particularly, a plurality of basic chambers are produced in the structure 1 and at least part of inserts already produced, and the basic chambers are filled with materials, the appearances of each whereof are different from those of the adjoining surfaces of the structure 1 or of the inserts, in order to form a plurality of basic inserts at least partially inserted into one another and filled with materials having different appearances in sets of two.

In one particular embodiment, at least one chamber is produced and digged, or both in the structure 1 and in at least one insert already produced, or both in at least two other inserts already produced.

In one particular embodiment, the visible surfaces of the inserts produced in the component 100 are engraved so as to form a low relief. More particularly, successive layers of inserts, of different appearances or different colours, are deposited and ultimately engraved at different depths in order to reveal the final pattern.

More specifically, it is understood that the inserts can each be hollowed out so as to receive another insert, but can also, in some configurations, be superimposed within the same recess in the structure or in another insert.

In one particular embodiment, the visible surface of at least one insert comprised in the component 100, which is set back relative to the local level of the visible surface 11 of the structure 1, is machined; even more particularly, the visible surfaces of the inserts comprised in the component 100, each set back relative to the local level of the visible surface 11 of the structure 1, are machined.

In one particular embodiment, the visible surface of at least one insert comprised in the component 100, which is flush with the local level of the visible surface 11 of the structure 1, is machined; even more particularly, the visible surfaces of the inserts comprised in the component 100, which are flush with the level of the visible surface 11 of the structure 1, are machined.

In yet another particular embodiment, the visible surface of at least one insert comprised in the component 100, which projects relative to the local level of the visible surface 11 of the structure 1, is machined; even more particularly, the visible surfaces of the inserts comprised in the component 100, which each project relative to the local level of the visible surface 11 of the structure 1, are machined.

In one particular embodiment, the second material is chosen from either a hard material or a ceramic.

In one particular embodiment, the material of at least one insert is chosen from a polymer or an epoxy resin or an acrylate resin or an alumina-filled resin or a zirconia-filled resin. More particularly, the material of each insert, produced in the component 100, is chosen from a polymer or an epoxy resin or an acrylate resin or an alumina-filled resin or a zirconia-filled resin.

In one particular embodiment, an enamel is chosen to form the material of at least one insert made in the component 100. More particularly, an enamel is chosen to form the material of each insert made in the component 100.

In one particular embodiment, a transparent or translucent material is chosen for at least one superficial insert visible to the user and covering at least one other insert, more particularly all of the other inserts, of the component 100.

In one particular embodiment, a light-reflecting material is chosen for at least one insert.

In one particular embodiment, a fluorescent or phosphorescent material is chosen for at least one insert.

In one particular embodiment, at least the finish of each cavity is carried out using a picosecond laser, and/or a femtosecond laser and/or an attosecond laser. More particularly, the entire cavity is produced using a picosecond laser, and/or a femtosecond laser and/or an attosecond laser.

In another embodiment, and when the material of the insert so allows, the cavity is machined by conventional machining using a tool and/or grinding wheel, or by spark machining, etc.

More particularly, at least one primary cavity 10 is produced when producing the structure 1, and the bottom of this primary cavity 10 is left rough before being filled with the second material.

More particularly, only the periphery of this primary cavity 10, the bottom whereof is left rough, is re-machined or laser machined, before filling with the second material.

More particularly, the side visible to the user, of each visible surface of each insert produced, undergoes surface machining.

One specific sequence consists of successively carrying out the following steps:
1. Producing a ceramic bezel by a conventional method (pressing of ceramic powder, sintering, machining, polishing)
2. Producing cavities, typically using a femtosecond and/or picosecond laser
3. Filling the cavities with a polymer of the acrylate or epoxy resin or alumina-filled resin or zirconia-filled resin type having a first colour
4. Polymerisation of the polymer
5. Optionally, levelling by machining and polishing
6. Producing cavities in the polymer using a femtosecond and/or picosecond laser
7. Filling the new cavities with a polymer of the acrylate or epoxy resin or alumina-filled resin or zirconia-filled resin type having a second colour
8. Polymerisation of the polymer
9. Optionally, levelling by machining and polishing
10. Optionally repeating the operation to add additional colours.

Another sequence consists of carrying out the following steps:
1. Producing a ceramic bezel by a conventional method (pressing of ceramic powder, sintering, machining, polishing)
2. Producing cavities using a laser (picosecond and/or femtosecond laser)
3. Filling the cavities with a polymer of the acrylate or epoxy resin or SLN or alumina-filled resin or zirconia-filled resin type having a first colour
4. Polymerisation of the polymer
5. Or filling the cavities with amorphous metal ("liquid metal" technique), or electroformed gold ("Ceragold" technique)
6. Or depositing a PVD layer (for example chromium nitride)
7. Optionally, levelling by machining and polishing
8. Producing cavities in the first polymer or the amorphous metal or the gold or the PVD layer+substrate, using a laser (picosecond and/or femtosecond laser)
9. Filling the new cavities with a second polymer of the acrylate or epoxy resin or SLN or alumina-filled resin or zirconia-filled resin type having a second colour
10. Polymerisation of the second polymer
11. Optionally, levelling by machining and polishing
12. Optionally repeating the sequence from step 8 to add additional colours.

FIG. 1 shows a component 100 produced according to the invention, with a structure 1 made of zirconia, a primary insert 2 made of a first polymer, a secondary insert 3 made of a second polymer, and three tertiary inserts 4 made of a third polymer. FIGS. 2 to 6 show the production of the primary insert and of the secondary insert:

FIG. 2: roughly machining the structure 1, for example by ceramic sintering;

FIG. 3: opening, using a laser, a first cavity 10 having a bottom 12 and a peripheral surface 13;

FIG. 4: filling the first cavity 10 with the first polymer, and polymerisation;

FIG. 5: opening, using a laser or by machining, a second cavity 20 in the primary insert 2 formed by the polymerisation of the first polymer and which comprises a visible surface 21, this second cavity 20 comprising a bottom surface 22 and a peripheral contour 23;

FIG. 6: filling the second cavity 20 with the second polymer, and polymerisation in order to form the secondary insert 3 which comprises a visible surface 31.

The tertiary inserts 4 produced in a similar manner are made in recesses 40 having bottoms 42, and comprise at least one visible surface 41.

FIG. 15 shows other successive inserts:
5 in a bottom recess 52, with a visible surface 51, and
6 in a bottom recess 62, with a visible surface 61.

FIG. 8 shows a component with a secondary insert 10 and intercaled with the structure 1 on the one hand, and a primary insert 2 on the other hand. After producing the primary insert 2 according to FIGS. 1 to 4, FIG. 9 shows the opening, using a laser or by machining, of a second cavity 20 both in the primary insert 2 and in the structure 1. FIG. 10 shows, similarly to FIG. 6, the filling of the second cavity 20 with the second polymer, and the polymerisation in order to form the secondary insert 3.

FIG. 21 shows different alternative embodiments for the basic operations described hereinabove, and showing the different relative levels between the top surfaces of the different inserts. Although the images L, M and P show the finished components with a continuous visible surface, or a surface that has been rectified or polished in the case of the image P, the images I, J, K, N, and O show insert surfaces that are set back from the surface of the structure 1, and the image H shows an insert that projects from the surface of the structure 1.

The invention further relates to a watch, or to a watch bracelet, comprising at least one component 100 produced according to this method.

In short, the invention allows a multi-decoration and/or multicoloured component to be produced, with potentially complex graphics, and high precision, and with an excellent guarantee in terms of resistance to wear. The invention is compatible with all types of decorations, with flat sections, colour gradations, inclusions, protruding reliefs and/or hollows. The invention further prevents, in some cases, the need for fastened display elements such as indexes and appliques, which can now be integrated directly into the overall decoration of a dial, a bezel, a case, etc.

In particular, the invention allows a decoration to be produced at significant depth with a plurality of colours. This method procures high precision in the positioning of the colours and very high definition of the edges, as shown in FIG. 16.

The invention claimed is:

1. A method for manufacturing a heterogeneous horological component (100), comprising:
producing a structure (1) made of a first material, which is a hard material or a ceramic, said structure (1) having formed therein a primary cavity (10);
surface machining a periphery of said primary cavity to produce a smooth peripheral surface having greater smoothness than an un-machined bottom surface;
providing in said primary cavity (10) a second material that is different in appearance from said first material to produce a primary insert (2), said primary insert having formed therein a secondary cavity (20); and
providing in said secondary cavity a third material that is different in appearance from said first material and/or from said second material to produce a secondary insert (3).

2. The method according to claim 1, further comprising producing a tertiary cavity (30) in said first material and/or of said second material and/or of said third material, and providing in said tertiary cavity (30) a fourth material that is different in appearance from said first material and/or from said second material and/or from said third material, to produce a tertiary insert (4).

3. The method of claim 2, further comprising producing a plurality of basic chambers in said structure (1) and in at least part of primary and secondary inserts already produced, wherein said basic chambers are provided with materials, the appearances of each said materials are different from those of the adjoining surfaces of said structure (1) or of said primary, secondary and tertiary inserts.

4. The method according to claim 2, further comprising producing at least one chamber in said structure (1) and in at least one of said primary, secondary and tertiary inserts already produced.

5. The method according to claim 1, further comprising producing a plurality of basic chambers in said structure (1) and in at least part of said primary and secondary inserts already produced, wherein said basic chambers are provided with materials, the appearances of each said materials are different from those of the adjoining surfaces of said structure (1) or of said primary and secondary inserts.

6. The method according to claim 1, further comprising producing, at least one chamber in said structure (1) and in at least one of said primary, secondary inserts already produced.

7. The method according to claim 1, wherein the visible surfaces of said inserts produced in said component (100) are engraved so as to form a low relief.

8. The method according to claim 1, wherein said second material is chosen from a hard material or a ceramic.

9. The method according to claim 1, wherein the material of at least one of said primary and secondary inserts is chosen from a polymer or an epoxy resin or an acrylate resin or an alumina-filled resin or a zirconia-filled resin.

10. The method according to claim 1, wherein an enamel is chosen to form the material of at least one of said primary and secondary inserts made in said component (100).

11. The method according to claim 1, wherein a transparent or translucent material is chosen for at least one superficial insert visible to the user and covering at least one of said primary and secondary inserts of said component (100).

12. The method according to claim 1, wherein a light-reflecting material, or a fluorescent or phosphorescent material is chosen for at least one of said primary and secondary inserts.

13. The method according to claim 1, wherein at least one superficial insert comprising a relief projecting from the visible surface (11) of said structure (1) is produced and constitutes a display element and/or a touch element for grasping and/or tactile identification by the user.

14. The method according to claim 1, wherein at least the finish of each said cavity is carried out using a femtosecond laser and/or a picosecond laser and/or an attosecond laser.

15. The method according to claim 1, wherein the primary cavity and said secondary cavity are provided in a thickness direction of the component.

16. The method according to claim 1, wherein said component (100) is a watch bezel or a watch case or a watch back or a watch crown or a watch push-piece or a watch crystal or a watch bracelet element or a watch bracelet clasp or a watch horn.

* * * * *